United States Patent
Lovley, II et al.

(10) Patent No.: US 8,632,084 B2
(45) Date of Patent: Jan. 21, 2014

(54) DRIFT SCOOTER

(71) Applicant: Bravo Sports, Santa Fe Springs, CA (US)

(72) Inventors: Jack B. Lovley, II, Lake Forest, CA (US); Ken Edlauer, Newbury Park, CA (US)

(73) Assignee: Bravo Sports, Santa Fe Springs, CA (US)

( * ) Notice: Subject to any disclaimer, the term of this patent is extended or adjusted under 35 U.S.C. 154(b) by 0 days.

(21) Appl. No.: 13/724,674

(22) Filed: Dec. 21, 2012

(65) Prior Publication Data

US 2013/0113172 A1 May 9, 2013

Related U.S. Application Data

(62) Division of application No. 12/750,163, filed on Mar. 30, 2010.

(51) Int. Cl.
*B62M 1/00* (2010.01)

(52) U.S. Cl.
USPC .................................................. 280/87.041

(58) Field of Classification Search
USPC ......................................... 280/87.041, 87.03
See application file for complete search history.

(56) References Cited

U.S. PATENT DOCUMENTS

| | | | |
|---|---|---|---|
| 2,005,910 A | 6/1935 | Andersen | |
| 3,203,706 A | 8/1965 | Boyden | |
| 3,992,029 A | 11/1976 | Washizawa et al. | |
| 4,029,330 A | 6/1977 | Runyan, Jr. | |
| 4,460,187 A | 7/1984 | Shimizu | |
| 4,540,192 A | 9/1985 | Shelton | |
| 4,775,162 A | 10/1988 | Chao | |
| 5,039,121 A | 8/1991 | Holter | |
| 5,125,687 A | 6/1992 | Hwang | |
| 5,160,155 A | 11/1992 | Barachet | |
| 5,975,546 A | 11/1999 | Strand | |
| 5,984,328 A | 11/1999 | Tipton | |
| 6,193,249 B1 | 2/2001 | Buscaglia | |
| 6,206,390 B1 | 3/2001 | Borg | |
| 6,428,022 B1 | 8/2002 | Namiki | |
| 6,488,295 B1 | 12/2002 | Bryant | |
| 6,520,517 B1 | 2/2003 | Chung et al. | |
| 6,619,678 B2 | 9/2003 | van Ardenne | |
| 6,808,188 B1 | 10/2004 | Fan | |
| 7,192,038 B2 * | 3/2007 | Tsai | 280/87.041 |
| 7,195,259 B2 | 3/2007 | Gang | |
| 7,338,056 B2 | 3/2008 | Chen et al. | |
| 7,597,334 B2 | 10/2009 | Chen | |

(Continued)

*Primary Examiner* — J. Allen Shriver, II
*Assistant Examiner* — James M Dolak
(74) *Attorney, Agent, or Firm* — Holland & Hart LLP; Bryan G. Pratt

(57) ABSTRACT

A drift scooter comprising a longitudinal frame including opposed leading and trailing end portions. A steering assembly is pivotably disposed on the leading end portion and includes a transverse member with two wheels rotatably supported on opposite ends of the transverse member. A stem is fixed in perpendicular orientation relative to the transverse member and a handlebar is connected to the stem. A rear wheel assembly is pivotably disposed on the trailing end portion, wherein the wheel assembly pivots about an upwardly extending pivot axis. The rear wheel assembly is preferably biased toward a centered position, aligned with a centerline of the frame. A resilient member is connected between the frame and a leading portion of the caster. The resilient member may be in the form of an extension spring. Means for adjusting the tension of the extension spring may also be included.

4 Claims, 5 Drawing Sheets

(56) References Cited

U.S. PATENT DOCUMENTS

| | | | |
|---|---|---|---|
| 7,784,833 B2 | 8/2010 | Tsuchie | |
| 7,862,062 B2 | 1/2011 | Armand et al. | |
| 8,146,947 B2 * | 4/2012 | Hadley | 280/87.041 |
| 8,215,676 B2 * | 7/2012 | Hadley | 280/87.041 |
| 2001/0017450 A1 | 8/2001 | Chuang | |
| 2002/0096846 A1 | 7/2002 | Chen | |

* cited by examiner

DRIFT SCOOTER

This application is a divisional of co-pending U.S. patent application Ser. No. 12/750,163, filed Mar. 30, 2010, herein incorporated by reference.

BACKGROUND

Non-motorized foot board scooters are known in the art. These scooters generally include a front wheel aligned with a back wheel, with each of the wheels being attached to a frame. The frame generally comprises a flat surface located between the two wheels for the rider to stand on and a steering assembly rising vertically from the front or leading end of the frame. The steering assembly is attached at one end to the front wheel for front wheel steering of the scooter and terminates at the other end in handle bars for the rider to use to steer the scooter. Forward movement of these non-motorized foot board scooters is normally achieved by the rider taking one foot off the flat surface and pushing against the ground with the foot removed from the flat surface to begin forward movement of the scooter. In order to negotiate turns on the typical scooter the rider turns the front wheel while leaning into the turn such that the front and rear wheels track along an arc in the usual manner. The turning style of the typical scooter is similar to that of riding a bicycle, for example.

While enjoyable to ride, the typical scooter design merely provides the same predictable cornering experience that is well known in the art. Accordingly, there exists a demand for a scooter that provides a new and exciting cornering sensation that enhances the rider's enjoyment in riding the scooter.

SUMMARY

Described herein are various embodiments of a drift scooter. Generally, the drift scooter comprises a longitudinal frame including opposed leading and trailing end portions. The scooter may include a deck extending along at least a portion of the frame. Preferably, the top surface of the deck includes a convex portion.

A steering assembly is pivotably disposed on the leading end portion and includes a transverse member with two wheels rotatably supported on opposite ends of the transverse member. A stem is fixed in perpendicular orientation relative to the transverse member and a handlebar is connected to the stem. The leading end portion includes a head tube with at least one bearing housed therein, the bearing including an inner race attached to the stem and an outer race attached to the head tube, wherein the inner and outer races include interfering projections that limit the rotation of the stem with respect to the frame.

A rear wheel assembly is pivotably disposed on the trailing end portion, wherein the wheel assembly pivots about an upwardly extending pivot axis. The pivot axis is inclined forwardly with respect to the leading and trailing end portions. The pivot axis is inclined forwardly with respect to vertical between about 5 and about 25 degrees. The rear wheel assembly may include a caster pivotable about the pivot axis and is preferably biased toward a centered position, wherein the caster is aligned with a centerline of the frame. The wheel assembly preferably includes an end stop that limits the extent to which the caster can pivot.

A resilient member is connected between the frame and a leading portion of the caster. The resilient member may be in the form of an extension spring, for example. Means for adjusting the tension of the extension spring may also be included. Preferably, a caster guard is disposed on the frame forward of the caster. The caster guard may also contain at least a portion of the extension spring therein.

Also contemplated is a method for inducing oversteer in a scooter during a turn on a surface. The method comprises providing the scooter with a rear wheel assembly pivotably disposed about a pivot axis on a trailing end portion of the scooter, the rear wheel assembly including a wheel rotatably mounted on an axle. The rear wheel assembly is biased toward a centered position, wherein the wheel is aligned with a centerline of the scooter. The axle is positioned rearward of the pivot axis such that a lateral load generated against the wheel by the surface during the turn causes the rear wheel assembly to pivot away from the centered position in a direction opposite the turn thereby inducing oversteer. The method may further comprise limiting the extent to which the rear wheel assembly can pivot. The scooter may further include a deck and the method further comprising maintaining the deck at a generally level attitude relative to the surface during the turn.

The foregoing and other features, utilities, and advantages of the drift scooter will be apparent from the following more particular description of the embodiments as illustrated in the accompanying drawings.

BRIEF DESCRIPTION OF THE DRAWINGS

The accompanying drawings, which are incorporated in and constitute a part of this specification, illustrate embodiments of a drift scooter and together with the description, serve to explain the principles and operation thereof. Like items in the drawings are generally referred to using the same numerical reference.

DETAILED DESCRIPTION

Described herein is a drift scooter that provides a new and exciting cornering sensation enhancing a rider's enjoyment. The design induces oversteer in the scooter as it turns thereby providing the sensation that the scooter is sliding or drifting. The sliding or drifting sensation simulates a feeling of extreme speed. Furthermore, controlling the drift through counter-steering provides an entertaining challenge for the rider.

Figure 1:
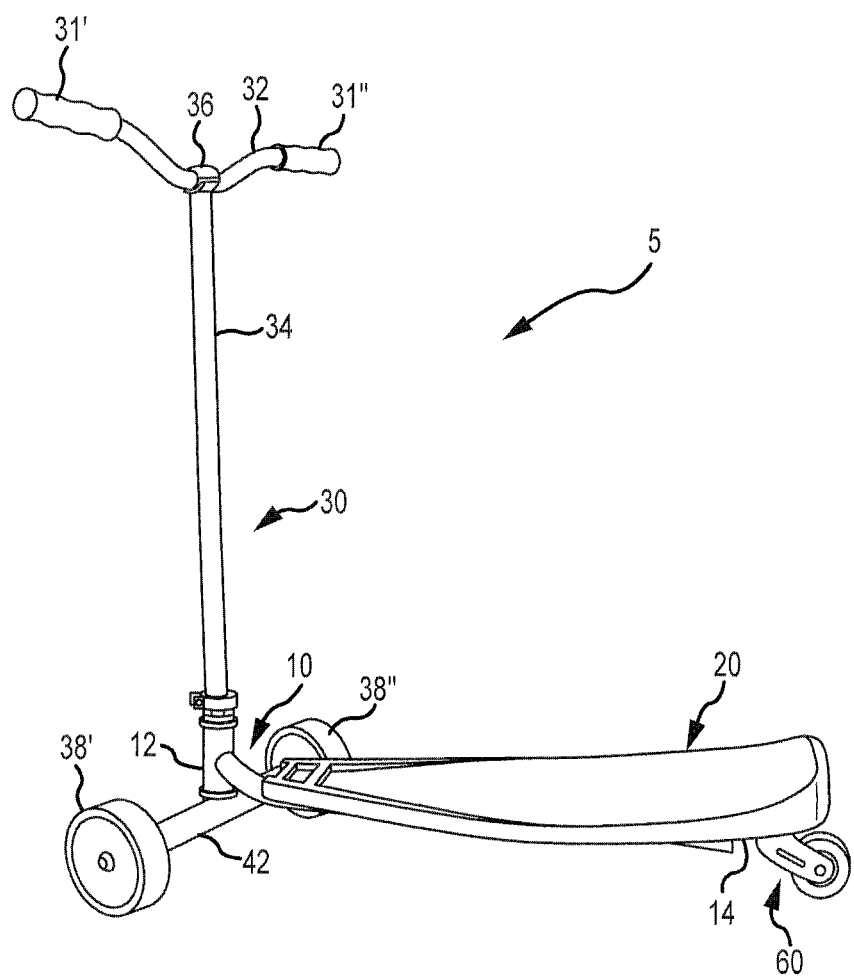
FIG. 1 is a perspective view of a scooter according to an exemplary embodiment.

FIG. 1 illustrates a drift scooter 5 according to an exemplary embodiment. Scooter 5 includes a frame 10 with a deck 20 disposed thereon. Pivotably supported on a leading end portion 12 of frame 10 is a steering assembly 30. Steering assembly 30 includes handlebar 32 with a pair of handgrips 31' and 31" disposed on opposite ends thereof. Handlebar 32 is secured to steering tube 34 by clamp 36. A transverse member 42 is connected to the handlebars 32 via the steering tube 34. Rotatably supported on opposite ends of transverse member 42 are front wheels 38' and 38". Rear wheel assembly 60 is rotatably disposed on trailing end portion 14 of frame 10. It can be appreciated from FIG. 1 that the scooter disclosed herein is preferably a three wheeled vehicle having two wheels located on the leading end of the scooter and a single wheel located on the trailing end of the scooter, A rider may stand on deck 20 while grasping handgrips 31' and 31". As with a conventional scooter, the rider may propel the scooter by kicking with one foot. It should also be understood that as a rider rotates handlebar 32 relative to frame 10 the entire steering assembly 30, including front wheels 38' and 38", also rotates in order to steer the scooter as desired.

Figure 2:
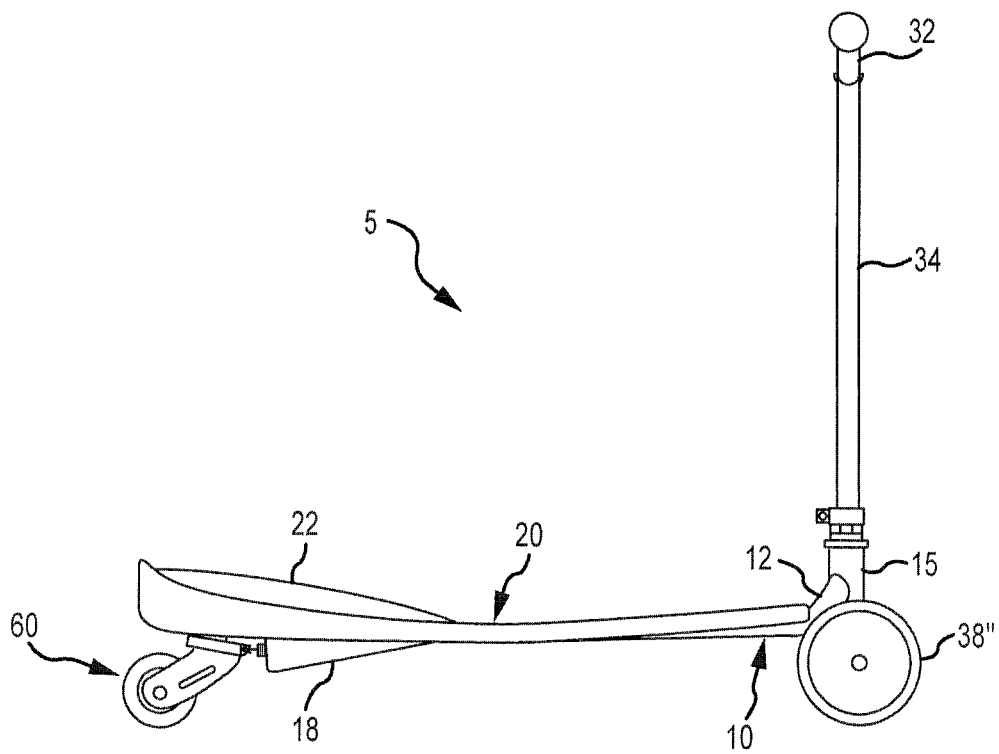
FIG. 2 is a right side elevation view of the scooter shown in FIG. 1.
Figure 3:
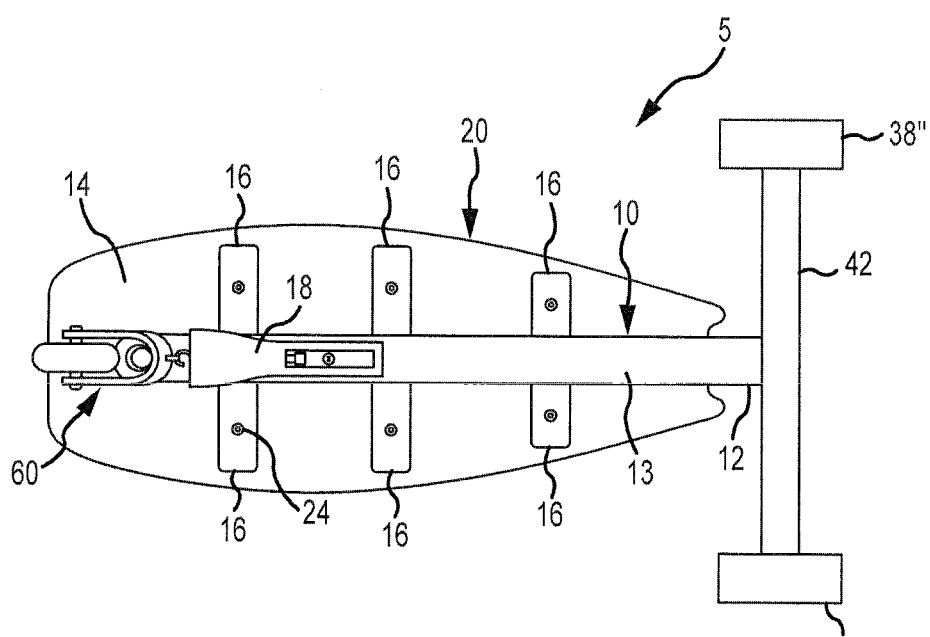
FIG. 3 is a bottom plan view of the scooter shown in FIGS. 1 and 2.

As perhaps best shown in FIG. 2, deck 20 includes a convex portion 22, which provides a contoured surface for the rider to brace against during drifting maneuvers which are explained more fully below. Leading end portion 12 includes head tube 15 through which handlebars 32 are connected to transverse member 42. With reference to both FIGS. 1 and 2, frame 10 arcuately extends upwards to meet head tube 15, thus lowering the center of gravity of the scooter. Frame 10 also includes wheel guard 18 disposed in front of rear wheel assembly 60. Wheel guard 18 protects rear wheel assembly 60 from impact with curbs and other obstacles which could potentially cause damage to rear wheel assembly 60. As shown here, wheel guard 18 is a ramp shaped member capable of deflecting obstacles away from the mounting portion of rear wheel assembly 60 such that obstacles may slide over the wheel guard 18 as well as rear wheel assembly 60 without directly impacting the wheel assembly. With further reference to FIG. 3, wheel guard 18 also has a tubular construction which may also house a centering spring and tension adjuster for the rear wheel assembly 60 as explained more fully below.

Also shown in FIG. 3, frame 10 includes opposed leading and trailing end portions, 12 and 14 respectively, with a longitudinal portion 13 extending therebetween. Extending transversely from longitudinal portion 13 is a plurality of rib supports 16 that support deck 20. In this embodiment, deck 20 is secured to rib supports 16 with a plurality of fasteners 24. Frame 10 may be formed of metal such as steel or aluminum. Deck 20 may be formed from plastic, wood, or light metals, or the like.

Figure 4:
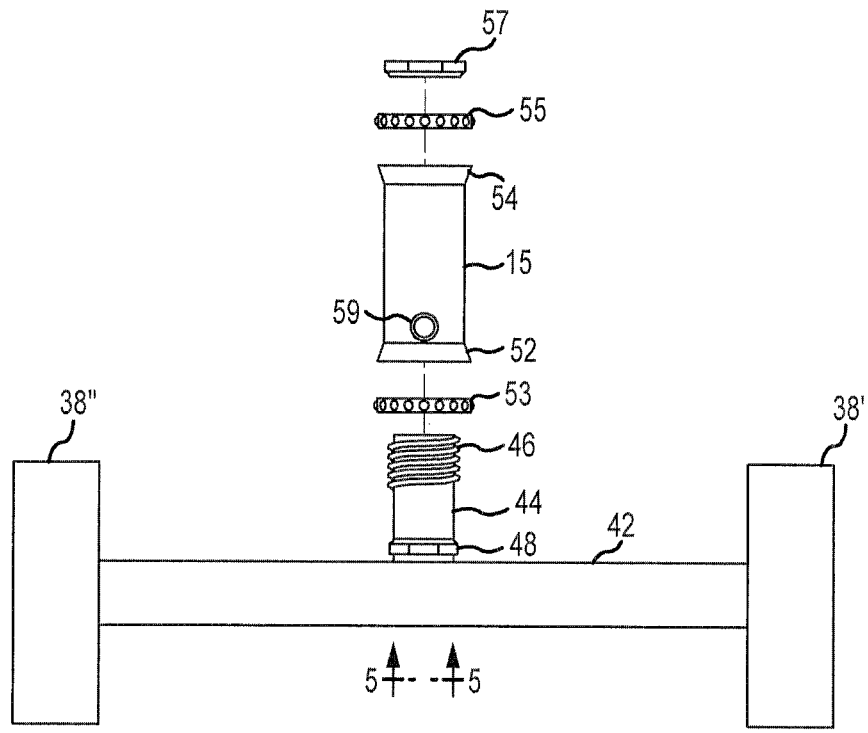
FIG. 4 is a partial front view of the scooter showing the steering assembly partially exploded.

FIG. 4 is a partial exploded view illustrating how steering assembly 30 is assembled with head tube 15. Stem 44 is fixed in perpendicular orientation relative to transverse member 42. Stem 44 may, for example, be welded to transverse member 42. When assembled, stem 44 extends through head tube 15 and is secured in place with bearing nut 57. Stem 44 includes a lower inner bearing race 48 which receives lower bearing 53. Head tube 15 includes lower and upper outer bearing races 52 and 54 respectively. Lower bearing race 52 receives lower bearing 53 and upper outer bearing race 54 receives upper bearing 55. Bearing nut 57 includes an inner race which engages upper bearing 55. Bearing nut 57 engages threads 46 disposed on the upper end of stem 44. The arrangement of inner and outer bearing races and upper and lower bearings is well known in the art and is typically used on bicycles. However, in this case lower inner bearing race 48 is preferably permanently attached to stem 44 by welding or otherwise so that it cannot rotate with respect to stem 44. Similarly, lower outer bearing race 52 is fixed to head tube 15 with a rivet 59 so that it cannot rotate with respect to head tube 15.

Figure 5:
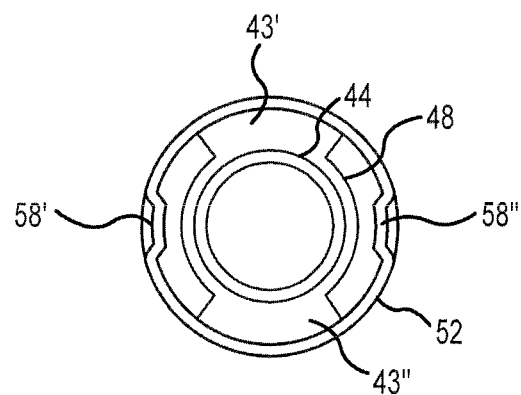
FIG. 5 is a partial bottom view of the steering assembly shown in FIG. 4 with the transverse member removed for clarity.

Referring now to FIG. 5, which shows the lower bearing races 48 and 52, lower bearing race 48 includes a pair of outwardly extending protrusions 43' and 43". Lower outer bearing race 52 includes a pair of inwardly extending protrusions 58' and 58". One of ordinary skill in the art will recognize that as stem 44 is rotated relative to head tube 15 protrusions 43' and 43" will interfere with protrusions 58' and 58". Thus, the left and right steering rotation of the steering assembly 30 relative to frame 10 is limited. Briefly returning to FIGS. 1 and 2 it can be appreciated that the rotation of steering assembly 30 is advantageously limited in order to prevent wheels 38' and 38" from interfering with frame 10 or deck 20.

Figure 6:
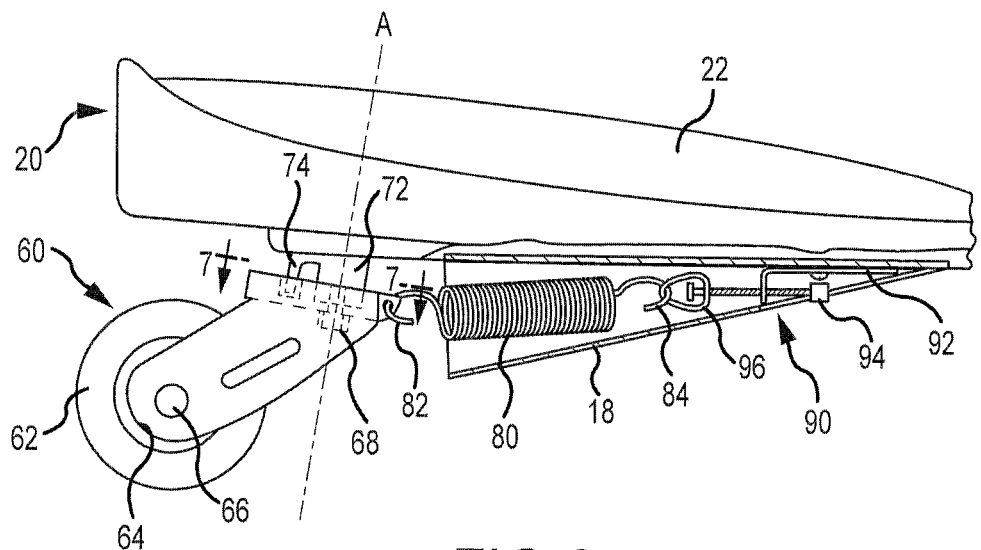
FIG. 6 is an enlarged partial side view of the frame and rear wheel assembly.

FIG. 6 illustrates a partial side view in partial cross-section of the rear wheel assembly 60 and a resilient member in the form of an extension spring 80 along with associated mounting components and features. In this embodiment, rear wheel assembly 60 is in the form of a caster which includes caster frame 64, rear wheel 62, and an axel 66 that supports rear wheel 62 in frame 64. Rear wheel assembly 60 is pivotably mounted on a spindle 72 which extends from trailing end portion 14. Caster frame 64 is mounted to spindle 72 with a suitable fastener 68. As can be appreciated in FIG. 6, rear wheel assembly 60 pivots about axis "A" which is inclined forwardly with respect to the leading and trailing end portions of frame 10. Axis "A" may be inclined at between about 5 and about 25 degrees, but preferably at about 18 degrees. The inclination of axis "A" has a tendency to center rear wheel assembly 60 along longitudinal frame portion 13. Thus, the rear wheel assembly is biased towards a centered position where the caster is aligned with a longitudinal axis of the frame. Also, by angling the caster, side to side motion of the caster tends to cause forward propulsion. This may be accomplished by weaving the scooter back and forth, for example.

Extension spring 80 acts on caster frame 64 in order to further bias the rear wheel assembly 60 toward the centered position. Extension spring 80 includes hook portions 82 and 84 which connect the spring between frame 10 and caster frame 64. Hook portion 82 connects to ear 63 (see FIG. 7) and hook portion 84 connects to frame 10 via tension adjuster 90. Tension adjuster 90 includes mounting bracket 92 which is attached to frame 10 through an opening in wheel guard 18. Threadably engaged through mounting bracket 92 is an adjustment screw 94 which has a connector loop 96 rotatably disposed thereon. Hook portion 84 is connected to loop 96 so that as adjustment screw 94 is threaded in or out with respect to mounting bracket 92 the tension of extension spring 80 is accordingly decreased or increased. It should be appreciated that while the resilient member has been described here as an extension spring other structures for biasing the caster to the centered position may be employed. For example, a torsion spring may be disposed about spindle 72 which engages the caster frame 64. Also, it is contemplated that compression springs could be arranged to bias the rear wheel assembly 60 toward the centered position. As mentioned above, wheel guard 18 houses extension spring 80 and tension adjuster 90. Thus, wheel guard 18 also protects the tensioning components.

Figure 7:
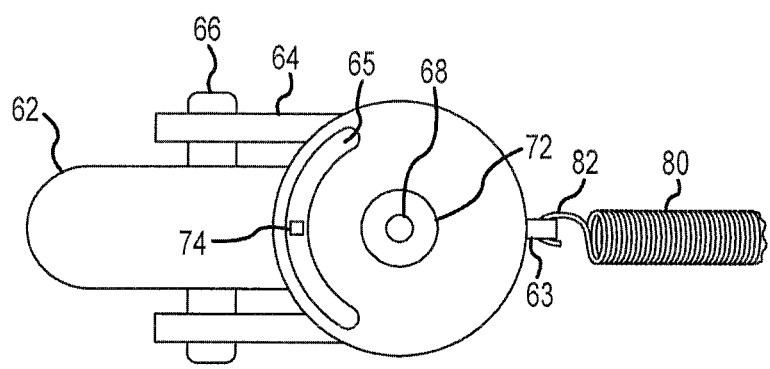
FIG. 7 is a cross-section of the rear wheel assembly taken about line 7-7 shown in FIG. 6.

With reference to FIG. 7, the rotation of rear wheel assembly 60 about axis "A" is limited by an end stop 74 extending from frame 10. End stop 74 extends into slot 65 which is formed in caster frame 64. As can be seen in the figure, slot 65 extends arcuately around a portion of the circumference of the caster frame. Thus, rotation of the rear wheel assembly 60 is limited by the length of the arcuate slot 65.

Figure 8A:
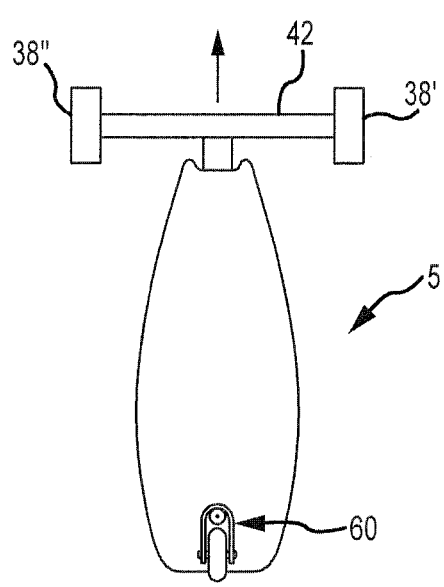
FIG. 8A is a schematic representation of the drift scooter as viewed from above illustrating the scooter traveling straight.
Figure 8B:
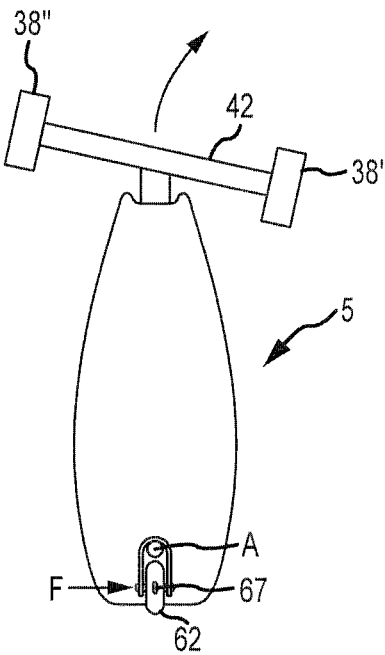
FIG. 8B is a schematic representation of the drift scooter as viewed from above illustrating the initiation of a right turn.
Figure 8C:
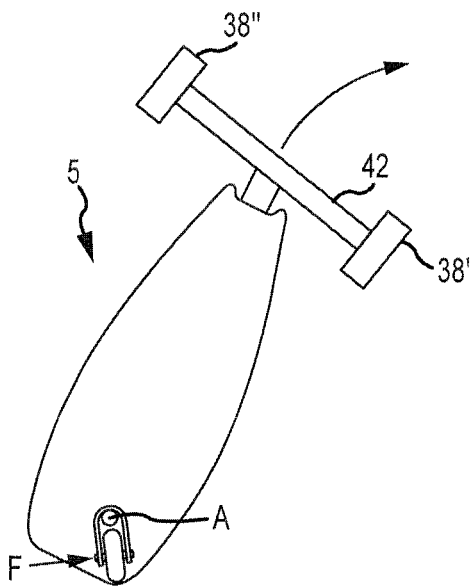
FIG. 8C is a schematic representation of the drift scooter as viewed from above illustrating oversteer induced by the pivoting rear wheel assembly.
Figure 8D:
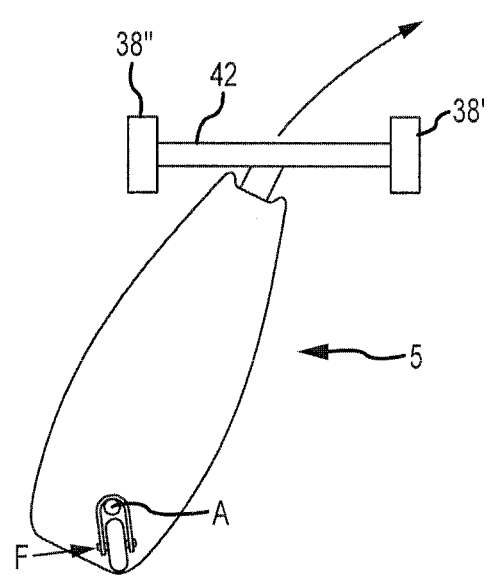
FIG. 8D is a schematic representation of the drift scooter as viewed from above illustrating the steering assembly turned to counteract oversteer induced by the pivoting wheel assembly.

Having described the structure of the drift scooter, the operation of the scooter can now be better appreciated. FIGS. 8A-8D are schematic representations of the scooter as viewed from above during various stages of a right hand drift turn. In FIG. 8A scooter 5 is shown traveling straight with the transverse member 42 and front wheels 38' and 38" oriented perpendicular to frame 10 while rear wheel assembly 60 is centered with respect to frame 10. FIG. 8B shows scooter 5 at the point of initiating a right-hand turn. Transverse member 42 and front wheels 38' and 38" are rotated to the right via the handle bars. As the scooter begins to turn, a lateral load or centripetal force "F" is exerted on contact patch 67 of rear wheel 62. It should be understood that contact patch 67 is offset from pivot axis "A" such that the centripetal force "F" acting on contact patch 67 causes rear wheel assembly 60 to rotate around pivot axis "A" such as shown in FIG. 8C. Thus, depending on the amount of centering bias exerted on rear wheel assembly 60 the wheel assembly will rotate about pivot axis "A" as the scooter generates enough centripetal force to overcome the centering bias. As shown in FIG. 8C, oversteer is induced in the scooter as rear wheel assembly 60 pivots in a direction opposite to the turn. As explained above with respect to FIG. 6, the tension in extension spring 80 may be adjusted. Increasing the tension in extension spring 80 will decrease the amount of oversteer and decreasing the tension will increase the amount of oversteer. Finally, as shown in FIG. 8D transverse member 42 and wheels 38' and 38" are rotated away from the turn (to the left) in order to compensate for the oversteer induced by rear wheel assembly 60. This technique of compensating for oversteer in a vehicle is often referred to as counter-steering. Convex portion 22 of deck 20 mentioned above provides a contoured or banked surface for the rider to stand against during a drift as described above. Note that the three wheeled configuration of the scooter with two front wheel facilitates the drift maneuvers described above while maintaining deck 20 at a generally parallel or level attitude with respect to the riding surface.

Methods relating to the above described drift scooter are also contemplated. The methods thus encompass the steps inherent in the above described mechanical structures and operation thereof. Broadly, one method could include inducing oversteer in a scooter during a turn on a surface. More specifically, the method could comprise providing the scooter with a rear wheel assembly pivotably disposed about a pivot axis on a trailing end portion of the scooter, the rear wheel assembly including a wheel rotatably mounted on an axle. The rear wheel assembly being biased toward a centered position, wherein the wheel is aligned with a centerline of the scooter. The axle is positioned rearward of the pivot axis such that a lateral load generated against the wheel by the surface during the turn causes the rear wheel assembly to pivot away from the centered position in a direction opposite the turn thereby inducing oversteer. The method may further comprise limiting the extent to which the rear wheel assembly can pivot. The scooter may further include a deck and the method further comprising maintaining the deck at a generally level attitude relative to the surface during the turn.

Accordingly, the drift scooter has been described with some degree of particularity directed to the exemplary embodiment. It should be appreciated, though, that the present invention is defined by the following claims construed in light of the prior art so that modifications or changes may be made to the exemplary embodiments without departing from the inventive concepts contained herein.

We claim:

1. A method for inducing oversteer in a scooter during a turn on a surface, the method comprising:
   providing the scooter with a rear wheel assembly pivotably disposed about a pivot axis on a trailing end portion of the scooter, said rear wheel assembly including only a single wheel rotatably mounted on an axle;
   biasing said rear wheel assembly toward a centered position, wherein said wheel is aligned with a centerline of the scooter; and
   positioning said axle rearward of said pivot axis such that a lateral load generated against said wheel by the surface during the turn causes the rear wheel assembly to pivot away from the centered position in a direction opposite the turn thereby inducing oversteer; wherein said scooter includes a deck and further comprising maintaining said deck at a generally parallel orientation relative to the surface during the turn.

2. The method according to claim 1, further comprising limiting the extent to which said rear wheel assembly can pivot.

3. A method for inducing oversteer in a scooter during a turn on a surface, the method comprising:
   providing the scooter with a rear wheel assembly pivotably disposed about a pivot axis on a trailing end portion of the scooter, said rear wheel assembly including a wheel rotatably mounted on an axle;
   biasing said rear wheel assembly toward a centered position, wherein said wheel is aligned with a centerline of the scooter; and
   positioning said axle rearward of said pivot axis such that a lateral load generated against said wheel by the surface during the turn causes the rear wheel assembly to pivot away from the centered position in a direction opposite the turn thereby inducing oversteer;
   wherein said scooter includes a deck and further comprising maintaining said deck at a generally parallel orientation relative to the surface during the turn.

4. The method according to claim 1, further comprising:
   angling the rear wheel assembly; and
   weaving said rear wheel assembly to induce forward propulsion of the scooter.

* * * * *